W. C. FORD.
Corn-Planter.
No. { 962, 31,966. }
Patented Apr. 9, 1861.
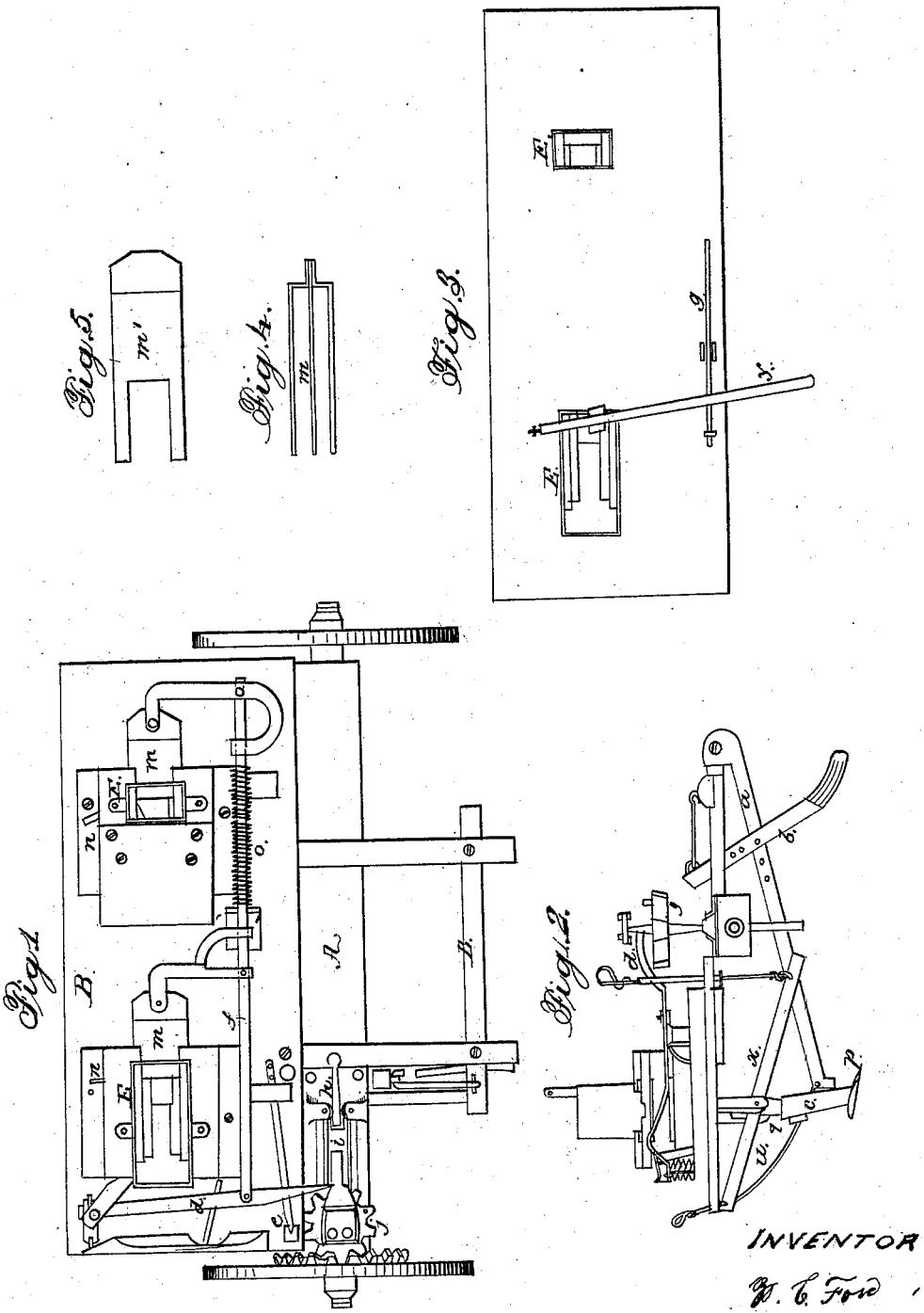
WITNESSES:
T. H. Alexander
Wm Hughes
INVENTOR
W. C. Ford

UNITED STATES PATENT OFFICE.

WILLIAM C. FORD, OF WEST SALEM, OHIO.

IMPROVEMENT IN CORN-PLANTERS.

Specification forming part of Letters Patent No. 31,966, dated April 9, 1861.

*To all whom it may concern:*

Be it known that I, WILLIAM C. FORD, of West Salem, in the county of Wayne and State of Ohio, have invented certain new and useful Improvements in Corn-Planters; and I do hereby declare that the following is a full, clear, and exact description of the same, reference being had to the annexed drawings, and to the letters of reference marked thereon, in which—

Figure 1 represents a plan of the machine with its top removed. Fig. 2 is an end view. Fig. 3 is a plan of the top. Figs. 4 and 5 represent the grain-slides.

The nature of my invention consists in the employment and arrangement of certain parts, the peculiarities of which will be hereinafter fully set forth.

To enable others skilled in the art to make and use my invention, I will now describe its construction and operation.

A represents the axle of the machine, and B the frame.

$i$ is a slide operated by means of lever $h$, as shown in Fig. 1.

J represents a pinion, said pinion is secured to slide $i$ by an upright shaft, (seen in Fig. 2,) and is operated by a bevel cog-wheel on the driving-wheel D. On the top of pinion J is a small pin or projection, the use of which will be more fully seen hereinafter.

$f$ represents the main rod, to which is connected the grain-slides $m\,m$, as seen in Fig. 1. The peculiar manner in which these slides are constructed is partially shown in Figs. 4 and 5. The bottom and top divison should be cut out, as shown in Fig. 5, while the middle partition is provided with an aperture, as seen in Fig. 4.

$d$ is a lever, and is pivoted to the main rod $f$. To the back part of lever $d$ is secured lever $x$, and to lever $x$ is attached lever $g$ by means of a cord. Under the back end of lever $d$ should be a spring, the advantage of which will be seen more fully hereinafter.

$e$ represents a spring. Said spring should be bent down at right angles, after it gets a little beyond lever $a$, and extend through the frame of the machine, in order that there may be a slide or some other convenient arrangement beneath to hold the spring down, and thus prevent it from acting upon lever $d$ when it is desirable. This, however, will be more definitely explained presently.

$o$ represents a spiral spring around the main rod $f$, for the purpose of forcing said rod back to its proper place when the slides have performed their proper function.

$a$ is a lever pivoted in front to the frame. It then extends through a mortise in the plow-beam $b$, back to the discharge-spout $c$, to which it is attached. The beam of plow $b$ extends up through the frame, and is connected thereto by means of a hoop and staple, as seen in Fig. 2. The discharge-spout $c$ is provided at its bottom with a shoe, $p$, which is slightly turned up at its sides. Thus as the grain falls to the ground this shoe turns the earth upon it and covers it up. The discharge-spout $c$ surrounds a tube, which is fastened beneath the aperture in the seed-box, (represented fully in Fig. 2;) or, in other words, it slides upon this tube $q$. The beam of plow $b$ and lever $a$ are provided with holes in order that the height of plow $b$ may be regulated.

It will be observed that, the lever $a$ being attached both to discharge-spout $c$ and plow $b$, their relative height or set will be always the same.

$y$ is a lever, which is connected to discharge-spout by means of the cord or wire $u$. Thus in uneven ground the operator can easily regulate both the discharge-spout and plow $b$ to any inequality of surface. $u\,u$ represent two grain-regulators, which are pivoted at the bottom of seed-boxes E E.

The operation of my machine is as follows: The boxes E E being provided with corn and the pinion $j$ properly adjusted by means of lever $h$, motion is given to the machine. As the pinion revolves the little projection strikes lever $d$ and forces it back over the spring $e$, thus moving the slides up to become charged with grain. The moment the machine arrives at a spot in which the grain is desired to be planted the operator bears down upon lever $g$, which at once relieves lever $a$ from spring $e$, and the main rod $f$ flies back to its proper place, carrying the slides with it, and thus depositing the grain at any particular spot; or, if preferred, the spring $e$ may be fastened down, so that it will not act upon lever $a$, and thus the machine can be made to drop at regular intervals. Whenever it is desirable to stop the machine from working, the operator can do so either by throwing it out of gear by means of lever $h$ or he may allow the lever $d$ to remain behind spring $e$, thus preventing said lever to be operated upon by the projection on pinion J.

Having thus described my invention, what I claim is—

1. Lever $a$, plow $b$, and sliding discharge-spout $c$, when combined and operated in the manner and for the purpose set forth.

2. The combination of lever $d$, spring $e$, main rod $f$, and lever $g$, when operated in the manner and for the purpose described.

3. Grain-slides $m$ $m$, regulators $n$ $n$, main rod $f$, levers $h$, $d$, and $y$, spring $e$, and slide $i$, when the whole shall be constructed, arranged, and operated in the manner and for the purpose set forth.

WILLIAM C. FORD.

Witnesses:
C. STARKWEATHERS,
JOHN R. HENNEY.